United States Patent
Grosch et al.

(10) Patent No.: US 12,298,744 B2
(45) Date of Patent: May 13, 2025

(54) HIGH-AVAILABILITY CLOUD-BASED AUTOMATION SOLUTION WITH OPTIMIZED TRANSMISSION TIMES

(71) Applicant: Siemens Aktiengesellschaft, Munich (DE)

(72) Inventors: Thomas Grosch, Rosstal (DE); Albert Renschler, Ettlingen (DE); Jürgen Laforsch, Bühl (DE)

(73) Assignee: Siemens Aktiengesellschaft, Munich (DE)

( * ) Notice: Subject to any disclaimer, the term of this patent is extended or adjusted under 35 U.S.C. 154(b) by 528 days.

(21) Appl. No.: 17/707,565

(22) Filed: Mar. 29, 2022

(65) Prior Publication Data
US 2022/0317665 A1 Oct. 6, 2022

(30) Foreign Application Priority Data
Mar. 30, 2021 (EP) .................................... 21166071

(51) Int. Cl.
*G05B 19/418* (2006.01)
(52) U.S. Cl.
CPC ................. *G05B 19/41835* (2013.01); *G05B 2219/31102* (2013.01); *G05B 2219/31368* (2013.01)
(58) Field of Classification Search
CPC .... G05B 19/41835; G05B 2219/31102; G05B 2219/31368; G05B 2219/24182; G05B 2219/24186; G05B 2219/24187; G05B 2219/25342; G05B 19/0428; G05B 19/0421; G05B 19/0423; G05B 9/03; G05B 19/054; G05B 9/02; G05B 19/042; G06F 11/18; G06F 11/2043
See application file for complete search history.

(56) References Cited

U.S. PATENT DOCUMENTS

| | | | |
|---|---|---|---|
| 2013/0290776 A1 | 10/2013 | Grosch et al. | |
| 2013/0318041 A1 | 11/2013 | Grosch et al. | |
| 2015/0095690 A1* | 4/2015 | Grosch | G06F 11/2097 714/4.11 |
| 2019/0302742 A1 | 10/2019 | Grosch et al. | |
| 2020/0280615 A1* | 9/2020 | Andersson | G05B 19/4184 |
| 2020/0310920 A1* | 10/2020 | McLaughlin | G06F 11/1423 |
| 2021/0103254 A1* | 4/2021 | Grosch | G06F 11/1675 |
| 2022/0271854 A1* | 8/2022 | Maruyama | H04L 67/125 |
| 2023/0243554 A1* | 8/2023 | Teruel Hernández | H02S 20/32 700/286 |
| 2024/0064218 A1* | 2/2024 | Wouhaybi | G05B 19/41835 |

FOREIGN PATENT DOCUMENTS

| | | |
|---|---|---|
| EP | 2657797 A1 | 10/2013 |
| EP | 2667269 A1 | 11/2013 |
| EP | 3547618 A1 | 10/2019 |
| EP | 3770704 A1 | 1/2021 |

\* cited by examiner

*Primary Examiner* — Alicia M. Choi
(74) *Attorney, Agent, or Firm* — Henry M. Feiereisen LLC

(57) ABSTRACT

The real time capability is to be improved in a Cloud-based control system for an automation plant. To this end, a redundantly embodied, Cloud-based control system with a plurality of computing resources distributed over a network with control applications running thereon is proposed, which, embodied as a primary and backups, execute a control program almost simultaneously and send corresponding program instructions to the automation plant. Long transmission times of individual computing resources therefore do not have a negative effect on the control of the automation plant.

19 Claims, 8 Drawing Sheets

HIGH-AVAILABILITY CLOUD-BASED AUTOMATION SOLUTION WITH OPTIMIZED TRANSMISSION TIMES

CROSS-REFERENCES TO RELATED APPLICATIONS

This application claims the priority of European Patent Application, Serial No, 21166071.7, flied Mar. 30, 2021, pursuant to 35 U.S.C. 119(a) (d), the content of which is incorporated herein by reference in its entirety as if fully set forth herein.

BACKGROUND OF THE INVENTION

The invention relates to a method for operating an automation system and to an automation system for carrying out such a method and to a redundant, Cloud-based control system.

The following discussion of related art is provided to assist the reader in understanding the advantages of the invention, and is not to be construed as an admission that this related art is prior art to this invention.

In the very recent past there have been several attempts to get control functions for an automation plant running on the basis of computing resources in a Cloud environment. The control program for control of the automation plant in this case is executed by means of control application on an application server and communicates via the global network (Internet) with a local peripheral unit of the automation plant. This method of operation has many shortcomings, e.g. the current poor reliability of Cloud-based services as well as the lack of real time capability of communication between application servers and peripheral units. This leads to wide variations in reaction times and thereby restricts the opportunities for using Cloud-based automation.

On account of the poor availability of Cloud-based services as well as the lack of real time capability in the global network (Internet), automation systems installed on site are nowadays used with dedicated hardware.

It would therefore be desirable and advantageous to improve real time capability in the control of an automation plant on the basis of computing resources in a Cloud environment address this problem and to obviate other prior art shortcomings.

SUMMARY OF THE INVENTION

According to one aspect of the present invention, a method for operating an automation system, which automation system includes at least one automation plant to be controlled installed at a plant location as well as at least two control applications configured for control of the automation plant and forming a part of a Cloud computing structure of which the computing resources are provided at different locations, which are connected to each other and to the automation plant for communication purposes via a network that has a plurality of communication node points and communication paths connecting said points to one another, includes designating a first control application of the at least two control applications as a primary control application and at least one second control application of the at least two control applications as a backup control application; with the primary control application, receiving via the network a first data packet originating from the automation plant and having an input value of the automation plant; processing, with the primary control application, the input value in accordance with program instructions of a control program which are encompassed by the at least two control applications and which are present in substantially identical form in the primary control application and in the backup control application, and generating therefrom an output value for an actuator that is part of the automation plant; transmitting a second data packet comprising the input value via the network to the backup control application; transmitting an enabling signal from the primary control application to the backup control application; in response to the enabling signal, processing with the backup control application the program instructions that correspond to the program instructions that were already processed by the primary control application, and generating therefrom with the backup control application the output value for the actuator; transmitting to the automation plant third data packets comprising the output values both from the primary control application and also from the backup control application, and using for controlling the actuator the third data packet that arrives first at the automation plant.

A method in accordance with the invention offers the advantage that, in the inventive Cloud computing structure in the form of a redundantly embodied (redundant) Cloud-based control system, a number of control applications execute the control program almost simultaneously and send corresponding control instructions to the automation plant. Long transmission times of individual computing resources do not thus have a negative effect on the control of the automation plant.

According to another advantageous feature of the invention, during operation of the automation system, first data packets with the respective current input value can be continuously created by the automation plant and transferred to the primary, second data packets with the input value can be created by the automation plant or by the primary and transferred to the backup, and third data packets with the respective current output value can be created by the primary control application, hereinafter also referred to as "primary", and the backup control application, hereinafter also referred to as "backup", and transferred to the automation plant.

The creation and reading out of the first data packets can be initiated by the automation plant. Advantageously, the peripheral unit can send the input values via all available logical connections both to the primary and also to all backups, for example according to the PROFINET standard for system redundancy, especially by multicast.

Advantageously, the peripheral unit can send current input data cyclically—in particular while referring to the PROFINET standard—to the primary. The primary stores the data in a buffer. In this buffer the data is continuously refreshed by the peripheral unit and thereby overwritten. The primary accesses this buffer if necessary.

As an alternative, the data can be read out from the automation plant by the primary. This means that the primary initiates the creation and sending out of the first data packets by the automation plant by corresponding read accesses.

The input value can involve any given value from the automation plant that is taken into account by a control application in the control of the automation plant. For example it can involve an actual value or sensor value detected by a sensor. The input value can however also stem from one or more sensor values, for example as a result of a signal processing carried out in the automation plant. Furthermore the input value can also relate to a state of the automation plant or can stem from such a state. The value of a specific parameter or a specific variable also comes under the designation "input value".

The input value is taken into account in the execution of the control program and an output value dependent on the input value is created for an actuator comprised by the automation plant. In particular the output value involves a control instruction for the actuator. Thus, by means of the Cloud-based control system, a closed-circuit controller structure can be realized, in which by means of the sensor an input value in the form of an actual value is detected, this actual value is compared by the control system with a required value and from this an output value in the form of a setting variable for the actuator is created and supplied to the actuator.

An actuator in the sense of the invention generally involves a constructional unit that performs an action in the automation system. In particular this involves an actuation element that brings about a movement of a component of the automation plant or a change to a physical variable such as pressure or temperature. For example the actuator can involve a drive, a valve or a switch.

The designation as "input value" or "output value" is based thereon, since it involves input values or output values as seen by the control system.

A data packet may also contain more than one input value or more than one output value, for example when the automation plant comprises a machine with a number of axes that are moved in conjunction, the actual values of all axes or the control instructions for all axes. Thus, as a rule a first data packet comprises a plurality of actual or input values from the automation plant and a third data packet comprises a plurality of output values or setting or control variables.

The invention furthermore offers—as well as the shortened response times—the advantage that even complex control functions and control functions that extend over a long period of time can be carried out by means of the automation system. Overall the availability of the inventive control system is improved compared to a conventional Cloud-based control.

According to another advantageous feature of the invention, the second data packet, comprising the (current) input value can be transmitted from the primary via the network to the backup. The primary thereby has control over which data packets are transmitted to the backup.

Typically, the Cloud computing structure will comprise not just one backup but a plurality of backups. What has been stated above and will be stated below with regard to "the backup" therefore applies by analogy to all backups of the Cloud computing structure.

The primary in the Cloud computing structure has the task of synchronization of the individual users. One possibility for achieving this synchronization lies in the fact that the primary where possible sends the current input value simultaneously by means of second data packets to all backups.

According to another advantageous feature of the invention, the second data packet comprising the input value can be transmitted directly, i.e. without the path via the primary, from the automation plant to the backup via the network.

In particular, the first and second data packet belonging to a specific input value are almost identical. They then differ if necessary only in the receiver network address or addresses.

This embodiment thus brings with it a timing advantage compared to the one mentioned above. However the synchronization must then be undertaken in another way, for example via enabling signals, as will be explained in more detail below.

The first data packets are thus characterized in that they are each created by the automation plant, comprise the current input value at the time that they were created and are transferred from the automation plant to the primary.

The second data packets are characterized in that they are created either by the automation plant or the primary, comprise the current input value at the time that they were sent and are transmitted to the backup.

The third data packets are characterized in that they are created both by the primary and also by the backup, comprise the current output value at the time that they were sent, in particular the current control instruction or the current control instructions, and are transferred to the automation plant.

Both the primary and also the backup or the backups are also referred to below as "subsystem" or "subsystems".

Described below in greater detail is the synchronization between the primary and the backup (or the backups) by means of enabling signals. As will be described in more detail later "synchronization" in connection with the invention does not mean that both subsystems (primary and backup) are simultaneously carrying out exactly the same program steps. Synchronization is instead to be understood in such a way that the two subsystems do not carry out the processing the program detached from one another or independently of one another, but that a coupling of the subsystems that will be explained in more detail below exists in the program processing. "Synchronous" in the sense of the invention can therefore also be referred to as "path synchronous", which is intended to convey that all synchronized subsystems must follow the same program paths but do not have to do this at exactly the same time.

An embodiment of the inventive method for operating a redundant automation system has at least one first and one second subsystem, which process a control program during the control of an automation plant in each case, wherein one of these subsystems acts as primary and the other subsystem as backup, is characterized in that processing sections of the control program to be processed by means of the primary are processed, after the occurrence of an event, at a time of the occurrence of an interruption point following the occurrence of this event, an enabling signal is transmitted to the backup by the primary and the primary continues to process its control program to be processed, and the enabling signal shows the backup the processing step up to which the backup may process its control program.

In one embodiment of the invention, because of the enabling signal, the processing sections of the control program to be processed by means of the backup can be processed that correspond to the processing sections of the control program already processed by means of the primary from a preceding enabling signal up to the enabling signal.

In an alternate embodiment of the invention, the primary may issue to the backup an enabling signal for processing a specific section of the control program, which is also processed by the primary, but even before the primary has finished processing this part of the control program. This method of operation is especially practical, even if before the conclusion of the processing of a specific section of the control programs by the primary it is clear which processing steps this part will comprise. The backup thus does not have to wait for the conclusion of these processing steps by the primary and the processing of the respective section of the control program can take place at least almost in parallel and simultaneously in the subsystems.

Another advantage of the disclosed method of operation is that the primary does not have to (actively) wait for an answer from the backup to be able to continue with its program processing. The transmission of all relevant information from the primary to the backup takes place asynchronously in time. Through this the processing power of primary is decoupled from the communication bandwidth available for an event synchronization, which in particular in respect of the increasing imbalance between the Increase in the processing power of the processors on one hand and the increase in the communication power on the other hand, is of significance, since the communication power can usually not keep pace with the increasing processing power.

In respect of the synchronization of the program processing on the two subsystems the invention offers the advantage that it is possible to dispense with temporally synchronous communication between the participants.

The synchronization of the two subsystems after the occurrence of an event can be undertaken synchronously to the extent that both the primary and the backup are following the same program paths as a result of this event, wherein the executions take place temporally asynchronously. This means that the primary is ahead of the secondary in respect of the program processing or execution or the backup is temporally behind the primary. Being "behind" or "ahead of" in this case is understood in this context as being the difference in time between the beginning of the processing of the processing sections by the primary and the beginning of the processing of the processing sections by the backup, which corresponds to the time of the occurrence of the enabling signal hi the backup.

Because of the temporally asynchronous communication between the primary and the backup it is possible also to use slow communication connections for establishing a redundant automation system. This means that even a communication connection that is poor in respect of the transmission bandwidth or response time can be provided or also a communication connection can be provided that is also used by other communication participants and thus is not exclusively available to the two participants for synchronization purposes. It is therefore possible to dispense with a separate physical synchronization connection. This is essential for an Internet-based Cloud environment, in which there are no exclusive connections.

Furthermore long distances between the two participants can also be overcome without degrading the system performance too much by high signal delay times or high latency times. In particular the primary and the backup can be connected to one another just over the Internet both for data transmission and also for synchronization.

In one embodiment of the invention, at the time of the transfer of the current enabling signals, plant input values can be transferred to the backup from the primary. The information relevant for the backup is first of all summarized or collected and finally transferred to the backup. Unlike in known temporal synchronization methods, as part of which relevant information must immediately be sent to the backup, this means a markedly reduced "administration effort" both for the primary and also for the backup.

In a further embodiment of the invention, the backup may acknowledge the respective enabling signal of the primary after the processing of the respective processing sections. The number of unacknowledged enabling signals indicates to the primary how far behind the backup currently is, whereby the primary can take suitable measures not to let the time lag become too great.

As already mentioned previously, a plurality of control applications can act as backups, the computing resources of which are provided at different sites and which are linked via the network to the automation plant as well as to the primary for communication purposes, which are comprised by the redundant automation system and which receive first data packets from the automation plant or the primary and create third data packets and transfer them to the automation plant.

With each new backup that uses different network paths the probability of long transmission times is potentially reduced. With each backup however the load on the network increases, which tends to lead to longer transmission times. Therefore, from a specific number of backups onward, only a small advantage can be obtained with each further backup. It is therefore only sensible to a certain extent to provide a very large number of backups.

The processing of the third data packets transferred to the automation plant and in particular the order of the processing is advantageously undertaken as a function of so-called sequence numbers. The use of sequence numbers is usual and has long been known for the transmission of data via networks.

In particular, for each first data packet transmitted from the automation plant to the primary, containing an actual value—on the part of the automation plant or on the part of the primary—a unique sequence number is issued. In particular the sequence number is updated starting from a start value with each new actual value or data packet, in particular incremented by one or reduced. There are however also other methods (as well as an increase or decrease by the value one in each case) known for determining a unique order of the sequence numbers.

The respective sequence number can be included in the first and/or second data packets and transmitted in this way by the automation plant or the primary also to the backup. It is however also possible for the backup to adapt the current value of the sequence numbers with each new actual value or each newly arriving data packet accordingly on its own, in particular increase it by one or reduce it. With this variant these is no need for transmission of the sequence numbers emanating from the automation plant or the primary to the backup.

In one embodiment of the invention, the first data-packets transmitted from the automation plant can each be provided with a unique sequence number and the primary and also the backup provide the third data packets corresponding to a first data packet in each case with a sequence number corresponding to the unique sequence number of the first data packet, in particular an identical number, to all backups.

Common to all variants is that for each input value both in the primary and also in the backup a unique identical sequence number exists, which is included in the respective, third data packet containing the control instruction concerned, which is sent from the primary or the backup to the automation plant.

The automation plant then recognizes, with aid of sequence number included in the respective third data packet transferred to the automation plant, which of the third data packets corresponding to a specific first data packet and thus to a specific input value transferred to the automation plant arrives first at the automation plant and processes this data packet and in particular the output value comprised by it.

Third data packets with the sequence number concerned arriving at the automation plant thereafter are ignored.

In this way, with aid of the sequence number for a specific first data packet emanating from the automation plant with a specific input value, the first third data packet arriving at the automation plant with output values or control instructions that are based on precisely this specified input value, is identified and the control instructions concerned are executed or implemented in the automation plant.

Through this the fastest data packet in each case or the output value comprised by it or the control instruction comprised by it becomes effective at the output of the peripheral unit to the actuator. The transmission time of the fastest data packet follows another distribution function in the redundant control system, in which shorter transmission times are more probable than would be the case with only a single control present in the network.

In one embodiment of the invention there is a transmission of the first and/or second and/or third data packets between the components of the automation system in accordance with the PROFINET standard. This standard is widely used in the industry and already allows the linkage or logical connection of a number of control units to a device or a plant.

In one embodiment of the invention at least one further control application, acting as a further backup, is linked into the automation system as part of a so-called "update phase" (AuA). Here too it is still true to say that the method Illustrated below for the linking of a further backup into the Cloud computing system—also referred to as "updating" below, can be applied in a similar way for the linking-in of further backups, in particular of any given number of backups.

One embodiment of the inventive method for operating an automation system having a first subsystem (primary) and at least one second subsystem (backup), which are each provided with a control program, wherein for linking a further subsystem (further backup), likewise provided with the control program into the automation system, relevant data of the first subsystem is transmitted to the further subsystem as part of an update phase of the automation system, is characterized in that
  at the beginning of the update phase a local copy of its relevant data (parameters, variables, internal states etc.) is set up by the first subsystem,
  during the update phase the copy, in particular fragmented, is transferred to the further subsystem by the first subsystem, and plant input values as well as enabling signals of the first subsystem are buffered, wherein the enabling signals indicate which processing sections of the control program the first subsystem has already processed,
  after the transfer of the copy enabled processing sections of the control program of the further subsystem that correspond to the processing sections of the control program of the first subsystem, taking into account the buffered input values, are processed by means of the further subsystem with a time lag, wherein to reduce the time lag of the processing, in particular to a predetermined value, the processing sections of the control program in the further subsystem are processed more quickly relative to the corresponding processing sections of the control program in the first subsystem.

Advantageously, the plant input values and also enabling signals can be buffered in the first subsystem (the primary).

What is achieved by this method of operation is that the further subsystem (the further backup) is linked into the Cloud computing structure and is synchronized with the first subsystem (the primary) and the subsystems (backups) comprised by the rest of the Cloud computing structure in such a way that the control program processed by the further backup is processed synchronously with control programs processed by the rest of the backups in each case. Wherein in this context too "synchronous" again means that the individual processing steps of the control programs in the different backups and the primary are not processed absolutely simultaneously, but with a time lag caused by the use and transfer of enabling signals.

The method of operation described for linking a further subsystem into the Cloud computing structure, in which relevant data of the first subsystem (primary) is transmitted to the further subsystem (a further backup) as part of an update phase of the automation system, can similarly be transferred to a plurality of further backups that are to be newly linked into the automation system. The backups newly linked into the automation system are then continuously synchronized by means of the enabling signals by the primary with the rest of the subsystems of the redundant, Cloud-based control system and create third data packets, which are sent to the automation plant.

Advantageously, this method of operation may dispense, for example, with a complex "dirty-bit mechanism". At the beginning of the update phase the first subsystem—the primary—creates a copy of its relevant data, which represents the internal state of the primary at the beginning of this update phase, wherein this data is transmitted, in particular fragmented, to the subsystem to be "updated" or that has been newly connected of the further (or "new") backup. This internal state is essentially determined or prespecified by statistical and dynamic data, data modules, plant input and output values and also configuration data. The new backup is finally matched to the internal state of the primary via the enabling signals step-by-step and temporally asynchronously to current processing of the control program by the primary, wherein the new backup only then begins with the processing of the enabling signals, when said backup has fully received the copy. The new backup, with the relevant data according to the enabling signals, then follows the same processing paths that the primary has already followed. This means that the primary, in respect of the program processing or execution, runs ahead of the backup in time or the backup runs behind the primary in time. "Running ahead of" or "running behind" in this context is also understood at this point as the temporal difference between the beginning of the processing of the processing sections by the primary and the beginning of the processing of the corresponding processing sections by the backup, which corresponds to the time of the occurrence of the enabling signal or of the enabling signal. It is further pointed out that a program is understood both as a program as such, and also as a subprogram, a part of a program, a parts program, a task, a thread, an organization module, a function module or any other suitable program code for implementing an automation function, wherein the programs of an automation system are usually divided into priority classes and are processed or executed in accordance with their assigned priority.

At the time at which the new backup has caught up with the time lag or slippage or this time lag falls below a predeterminable or predetermined period of time and one that is seen as non-critical and or a tolerable measure, the update phase is concluded and the automation system acts from this point onward in a redundant type of operation with an increased number of backups.

Because of the temporally asynchronous communication between the primary and the backup during the update phase it is possible also to use slow communication connections.

This means that even a communication connection that is poor per se in respect of the transmission bandwidth or response time can be provided or also a communication connection that is also used by other communication participants and is thus not exclusively available for the coupling and updating process. It is therefore also possible to dispense with a separate synchronization connection. Great distances between the two subsystems can further also be overcome without degrading the system performance by high signal time lag times or high latency times. The inventive automation system is therefore best suited for a Cloud computing structure with subsystems networked with one another via the Internet.

In one embodiment of the invention, the plant input values may be transferred together with the enabling signals to the other subsystem. The information relevant for the other subsystem is first of all summarized or collected and finally transferred to the other subsystem. Through this the "administration effort" for both subsystems is reduced.

Advantageously, further backups can be linked into the automation system, in particular according to the method of operation for "updating" described, until an abort criterion is reached.

An abort criterion can for example be a predetermined or predeterminable maximum number of backups present in the automation system, for example 100.

Another abort criterion can relate to the expected shortening of the response times that a further backup in the system brings about. Thus the linking of further backups can be stopped when the expected reduction of the response times by the linking of the further backup concerned lies below a specific threshold value, for example below 1 ms. The threshold value is in particular dependent on the concrete application. Thus, for specific applications, threshold values of 10 ms or 100 ms, or almost any other value, can be sensible.

In one embodiment of the invention, it is determined with the aid of statistical methods to what extent the linking of a further backup or further backups into the automation system reduces response times able to be achieved in the automation system and, depending on the result of this determination, where necessary the further backup or the further backups are linked (automatically) into the automation system.

The fewer backups the automation system comprises, the more additional backups can contribute to a reduction of the transmission times. As from a specific number of backups, dependent on a plurality of factors, improvements are hardly able to be achieved any longer however. Through the additional data traffic in the network created by each backup it even comes to a point at which additional backups lead to a deterioration of the transmission times. This situation is to be avoided.

Advantageously, the control system may be dynamically reconfigured. This means that not only can new backups be linked into the system but they are also able to be removed from it again. In this way it is achieved that, with a fluctuating network load, the optimum arrangement can always be automatically determined and configured from the point of view of the reaction time. The dynamic reconfiguration continuously finds the possible minimum for the reaction times.

The advantage of this solution lies in the fact that the reaction times of Cloud-based automation solutions can be reduced or optimized and thus their application is possible for the first time. The network load is only increased by the inventive method to the extent that is necessary for the given requirements.

In one embodiment of the invention, new logical connections (new backups) may be added until such time as the probability of long transmission times is less than the probability of a failure of the automation system. The failure of the plant can either be caused by a hardware defect or by reaction times that are too long. The probability of a hardware defect can be determined for example from the failure rates of the plant components. The criterion in this case is that a transmission time that is too long is sufficiently improbable, so the overall failure probability is not significantly increased thereby.

In one embodiment of the invention, an assignment of a role of a specific control application as primary or as backup may be switched during the operation of the automation system, so that the redundancy is maintained. The switch can be made as a result of particular events, for example a measured, especially long response time of the previous primary, or can also take place cyclically at predetermined or predeterminable time intervals.

In particular when the transmission times for the data packets transmitted from the automation plant and/or the data packets received by the automation plant are determined, it can be established which backups have especially low transmission times. The assignment of the role as "primary" for a specific control application is then advantageously undertaken depending on the transmission times determined. In particular the control application that has the shortest transmission times overall within a specific period of time can then assume the role of primary.

The invention is not restricted to a specific type of automation plant, but can in principle be used with any automation plant, for example a production plant, a manufacturing plant or processing plant, a plant from the process industry etc. In particular the automation plant can also just have a single machine controlled by means of the control system or a single device controlled by means of the control system. As a rule the inventively controlled automation plant comprises a plurality of machines and/or devices however.

The automation plant has at least one sensor, which delivers a sensor signal, and at least one actuator, which is controlled depending on the sensor signal. In this context "controlled" is not understood in the strict sense of control technology but also includes closed-loop control processes as well.

The control function is carried out in accordance with the invention by the particular control application. In particular, the control application carries out control functions of an industry PC, a programmable logic control (PLC), a numerical control (CNC) or another industrial control.

In one embodiment of the invention, the enabling signal can be transferred by the primary to the backup in each case after a predetermined time interval has elapsed or after the occurrence of a specific event. It is precisely determined thereby by what and at what intervals the synchronization of the subsystems (in the sense of the invention) is brought about. In particular the time lag time between the primary and the backups can be influenced in this way.

According to another aspect of the invention, an automation system includes an automation plant (AA) and a redundant Cloud-based control system. The Cloud-based control system comprises control applications forming a part of a Cloud computing structure, of which the computing resources are provided at different locations and which are connected to one another and to the automation plant to be controlled for communication purposes via a network, which has a plurality of communication node points and communication paths connecting said points to one another, and is configured to carry out the aforedescribed method.

According to yet another aspect of the invention, a redundant Cloud-based control system for an automation system includes control applications forming a part of a Cloud computing structure, of which the computing resources are provided at different sites and which are connected to one another and to an automation plant (AA) to be controlled for communication purposes via a network (N), which has a plurality of communication node points (KP) and communication paths (P) connecting said points to one another.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
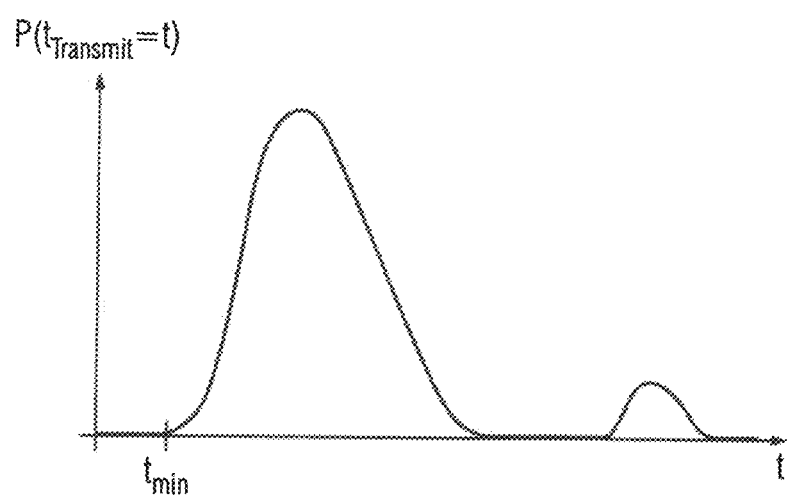
FIG. 1 shows transmission times for a data transmission in a computer network.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a typical distribution for the transmission times in a data transmission in a computer network, for example the Internet. The minimum transmission time is determined by the physical circumstances of the transmission link. Over said link there is a large bandwidth in transmission times right through to very large values, which there is a lower probability of observing however.

An automation plant to be controlled via the computer network would accordingly have to tolerate long delays, which is only possible for very few plants. This has thus far greatly restricted the opportunities for employing Cloud-based automation.

Figure 2:
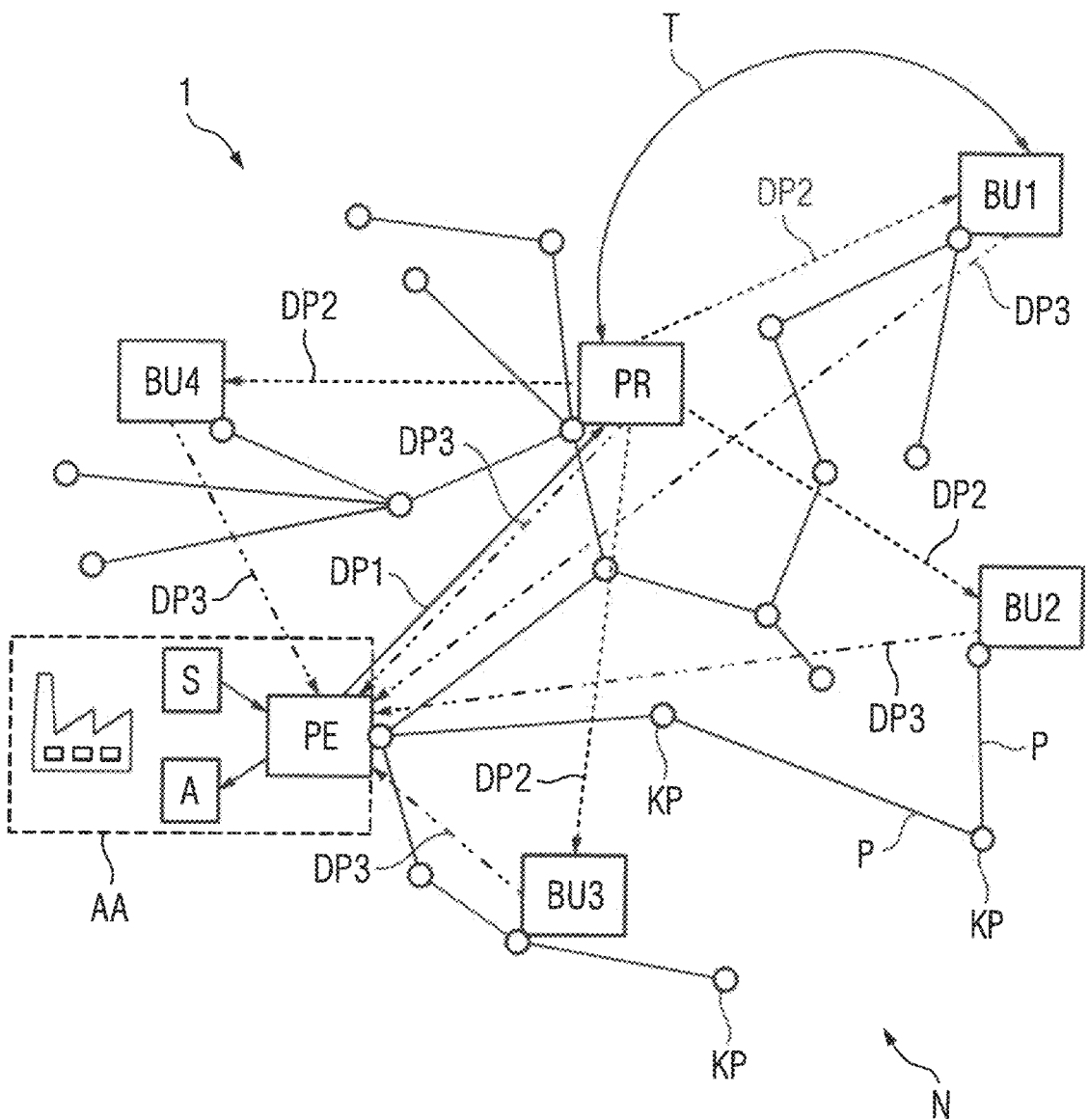
FIG. 2 shows a Cloud computing structure with a primary and a number of backups, which are connected to one another and to an automation plant via a network, for control of the automation plant.

FIG. 2 shows a redundant automation system 1 in accordance with the invention. The automation system 1 comprises at least one automation plant AA to be controlled, set up at a plant location, as well as five control applications configured for control of the automation plant AA, forming a part of a Cloud computing structure, the computing resources of which are provided at different locations and which are connected to one another and to the automation plant AA for communication purposes via a network N, in particular the Internet, which has a plurality of communication node points KP and communication paths P connecting said points to one another. In FIG. 2, for reasons of clarity, only a few of the communication node points KP or communication paths P are provided with the respective reference characters KP or P.

One of the control applications is embodied as the primary PR and the four further control applications in the exemplary embodiment as backups BU1 to BU4. The primary PR and the backups BU1 to BU4 together form a redundant, Cloud-based control system, also referred to as a Cloud computing structure, for control of the automation plant AA.

The automation plant AA is likewise connected to the network N by a computer referred to as a peripheral unit PE comprised by the automation plant AA. The peripheral unit PE in particular looks after the linkage of the automation plant AA to the network and thus the data transmission between the automation plant AA and the control system. Preferably the peripheral unit PE also possesses a certain intelligence, for example for processing and preparing sensor data before it is transmitted to the primary. It is further conceivable for the control instructions transferred from the control system to the automation plant AA initially to be prepared or processed in the peripheral unit PE before they are supplied to actuators of the automation plant A.

The automation plant AA for example furthermore comprises a sensor S and also an actuator A. Naturally an inventive automation plant AA can also have a plurality of sensors S and actuators A. The functional principle of the invention is therefore only intended to be illustrated by the automation plant AA shown by way of example. The sensor S creates a sensor signal, from which either directly or after processing, for example filtering, an actual value valid for a specific point in time stems.

A first data packet DP1 comprising the actual value (input value) is now sent by the automation plant A, in particular the peripheral unit PE of the automation plant AA via the network N to the primary PR. In this case the peripheral unit PE can transmit the actual value of its own accord, for example cyclically, to the primary PR. The first data packet can however also be transmitted to the primary PR as a result of a readout process initiated by the primary PR.

The primary PR processes the actual value in accordance with specific program instructions of a control program comprised by the control applications, at least essentially present in identical form in the primary PR and the backups BU1 to BU4 and from this creates a control instruction (an output value) for the actuator A comprised by the automation plant AA.

Furthermore second data packets DP2 comprising the current actual value emanating from the peripheral unit PE or the primary PR are transmitted via the network N to the backups BU1 to BU4.

Furthermore the primary PR, in particular after a specific time interval ($Z_i$, i=1, 2, . . . ) has elapsed or after the occurrence of an event (E) (for example "primary has concluded processing" or "primary has carried out a change of task") transmits enabling signals (F1, F2, . . . ) to the backups BU1 to BU4, from which it emerges which specific program instructions of the control program are triggered by the backups BU1 to BU4 for execution. The enabling signals are likewise transmitted via the network N.

In particular the backups BU1 to BU4, as a result of the enabling signals, process the same specific program instructions of the control program, which were already processed by the primary PR before being triggered. In this case the same actual values are taken into account by the respective program instruction that were also taken into account by the primary. The backups BU1 to BU4 thus likewise create a control instruction for the actuator A comprised by the automation plant AA with regard to the current actual value.

Both the primary PR and also the backups BU1 to BU4 create the third data packets DP3 comprising the respective control instruction and send these—likewise via the network N—to the automation plant AA.

Only the third data packet Dp3 arriving first at the automation plant AA is finally used for control of the actuator A.

Further indicated in FIG. 2 is a switchover of the primary role. The primary role specifies which control application within the Cloud computing structure is currently occupying the role of primary. In accordance with the exemplary embodiment there is provision for the primary role to switch between the control applications at specific intervals or as a result of specific events. The switch can be made for example cyclically at fixed intervals. It is further possible for the transmission times within the network N to be detected and a control application with especially short transmission times, in particular the shortest transmission times within a specific interval, to take over the primary role.

Indicated by the transfer arrow T in FIG. 2 is a switch of the primary role between the current primary PR and the backup BU1. This is intended to mean that subsequently the current backup BU1 takes over the role of primary and the current primary PR takes over the role of the backup BU1. Naturally the switch of the primary role can also be made with another backup BU2 to BU4 in the control system.

It should also be pointed out in addition that a "switch of primary role" can also be understood as a backup already integrated into the system or a new backup to be integrated into the system taking over the role of primary in the future and the previous primary dropping out of the control system, i.e. not taking the role of a backup.

The functional principle underlying the synchronization is explained below, without restricting its general applicability, with the aid of a primary and a single backup. In reality the inventive automation system comprises a plurality of backups however, which are synchronized with the primary in a similar way.

In the exemplary embodiment in accordance with FIG. 2 the peripheral unit PE receives via input lines signals from measurement transducers or measured value generators (sensors) S, which serve to detect a plant state, and outputs via output lines signals to actuation elements (actuators) A, with which the automation plant AA is influenced. The control applications (subsystems) PR and BU1 to BU4 execute the same control program cyclically and essentially synchronously.

Figure 3:
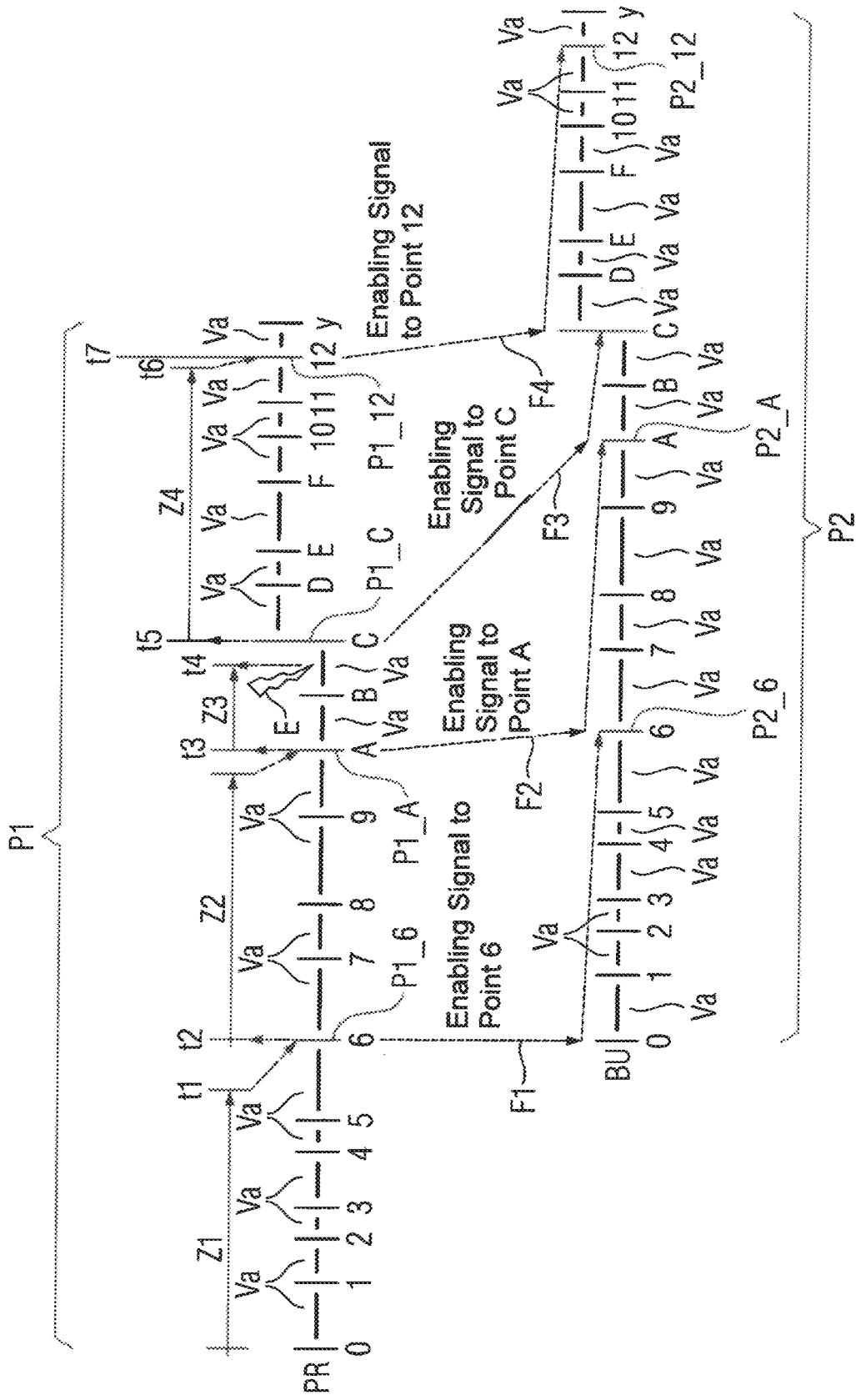
FIG. 3 shows the synchronization between the primary and a backup.

To explain an event-synchronous processing of the control programs the reader is referred below to FIG. 3, in which execution sequences of a temporally asynchronous coupling of two subsystems, a primary PR and a backup BU, are shown, which control a technical process. An "event-synchronous processing" means in this context that both the primary PR and also the backup BU, as a result of an event, follow the same program paths of the respective control program, wherein the executions take place temporally asynchronously.

The primary PR is the lead system in respect of the control of the technical process, wherein the primary PR reads the input values, also referred to below as process input information, process input values, plant input information or plant input values, from the peripheral unit PE and provides them temporally asynchronously to the backup BU.

As an alternative the backup BU could also read the values directly from the peripheral unit PE or receive data packets sent directly from the peripheral unit PE, but may however only begin their processing after it is instructed by the primary PR—via corresponding enabling signals—to do so.

The primary PR processes a program P1 for control of the technical process, wherein the backup BU also processes a program P2 corresponding to this control program P1. Both control programs P1, P2 have a plurality of processing sections (Va) of different duration, wherein the control programs P1, P2 are able to be interrupted at the respective beginning and the respective end of each processing section Va. Beginning and end of each processing section Va, which usually comprises a plurality of program codes, thus represent interruptible program or interruption points $0, 1, 2, \ldots y$. At these points $0, 1, 2, \ldots y$ the respective control program P1, P2 can be interrupted if necessary by means of the primary PR and the backup BU in order to be able to initiate suitable reactions after the occurrence of an event or a process alarm. At these interruption points $0, 1, 2, \ldots y$ the respective control program P1, P2 can further be interrupted, so that the primary PR and the backup RU can exchange enabling signals, acknowledgements or other information via the network.

After a respective predeterminable or predetermined interval $Z_i$, $i=1, 2, \ldots$ has elapsed and at the respective time that an interruption point occurs after the respective interval $Z_i$ has elapsed—preferably the first interruption point following the respective interval $Z_i$—the primary PR transfers to the backup BU an enabling or an enabling signal, which shows the backup BU the processing step Va up to which the backup BU may process the control program P2. These processing sections Va of the control program P2 correspond to those that the primary PR has already processed during the processing of the control program P1. In the present exemplary embodiment it is assumed that after a time interval Z1 has elapsed, at a time t1 and at a time t2 at which a first interruption point P1_6 (interruption point 6) follows the interval Z1, the primary PR transfers to the backup BU an enabling signal F1. This enabling signal F1 comprises the information for the backup BU that said backup may process its control program P2 to be processed up to an interruption point P2_6 (interruption point 6), wherein the interruption point P2_6 of the control program P2 corresponds to the interruption point P1_6 of the control program P1. This means that, as a result of the enabling signal, the backup BU can process the processing sections Va of the control program P2 that correspond to the processing sections Va of the control program P1 up to the time of the creation of the enabling or of the enabling signal, wherein in the example it is assumed for the sake of simplicity that the time of creation of the enabling signal corresponds to the time of transfer of the enabling signal to backup BU. The processing of these processing steps Va by means of the backups BU thus takes place temporally asynchronously to the processing of the corresponding processing sections Va by means of the primary PR, wherein after the processing of the processing sections Va of the control program P2 by the backup BU, a processing of further processing sections Va by the backup BU only takes place when the primary PR transfers a further enabling signal to the backup BU. The time of the occurrence of this interruption point P1_6, P2_6 (interruption point 6) represents the beginning of an interval Z2 following on from the interval Z1.

In the manner described the further temporally asynchronous processing of the control programs P1, P2 takes place. At a time t3 of the occurrence of a first interruption point P1_A after the interval Z2 has elapsed, the primary PR transfers to the backup BU a further enabling signal F2, which shows the backup BU that it can process these further processing sections Va up to the interruption point P2_A. These processing sections Va once again correspond to those that the primary PR has already processed from time t2 to time t3, i.e. up to interruption point P1_A. This means that the backup BU processes the processing sections Va from the time t2 of the previous enabling signal F1 to the time t3 of the current enabling signal F2. The time t3, at which the first interruption point P1_A has occurred after the interval Z2 has elapsed is the beginning of an interval Z3 following on from the interval Z2.

It can now occur that during an interval an event, for example an event in the form of a process alarm, occurs. In the exemplary embodiment such an event is designated by E, to which the primary PR must react suitably during the interval Z3 at a time t4 in accordance with the control program P1. In this case the primary PR transfers an enabling signal F3 to the backup BU not at a time of the occurrence of an interruption point following the interval Z3 after the interval Z3, but at a time t5 of the occurrence and an interruption point P1_C (interruption point C) following the occurrence of the event E. This means that the interval Z3 is shortened because of the event E, wherein the time t5 is the beginning of a following interval Z4. Because of the enabling signal F3 transferred to the backup BU the backup BU processes the processing sections Va of the control program P2 that correspond to the processing sections Va of the control program P1 that the primary PR has already processed between the times t3 and t5.

Because of the event E the primary PR processes processing sections Va of higher priority during the interval Z4, for example the primary PR undertakes a change of thread at time t5, and once again, after the interval Z4 has elapsed, transfers at time t6 an enabling signal F4 to a time t7, at which a first interruption point P1_12 (interruption point 12) following on from the interval Z4 occurs. Because of this enabling signal the backup BU likewise processes processing sections Va up to an interruption point P2_12 (interruption point 12) of the control program P2, wherein these processing sections Va correspond to the processing sections Va of the control program P1 between the times t5 and t7 and wherein the backup BU likewise undertakes a change of thread.

As explained, the enabling signals of the primary PR put the backup BU in the position of executing the same thread stack as the primary PR, which means that the backup BU undertakes a "change of thread" at a point in the control program P2 that corresponds to the point in the control program P1. The backup BU only continues its processing when this system is requested to do so by the primary PR by an enabling signal. In respect of the processing of the processing sections the primary PR processes these in real time like a standalone system or like in non-redundant operation and at regular intervals and also after the occurrence of events, issues enabling signals for processing corresponding processing sections by the backup BU, wherein the primary PR continues to process its control program P1 and does not wait actively for a response of the backup BU. The backup BU runs behind the primary PR as regards the processing of the corresponding processing sections and processes said section as a result of the primary enabling signals issued.

Figure 4:
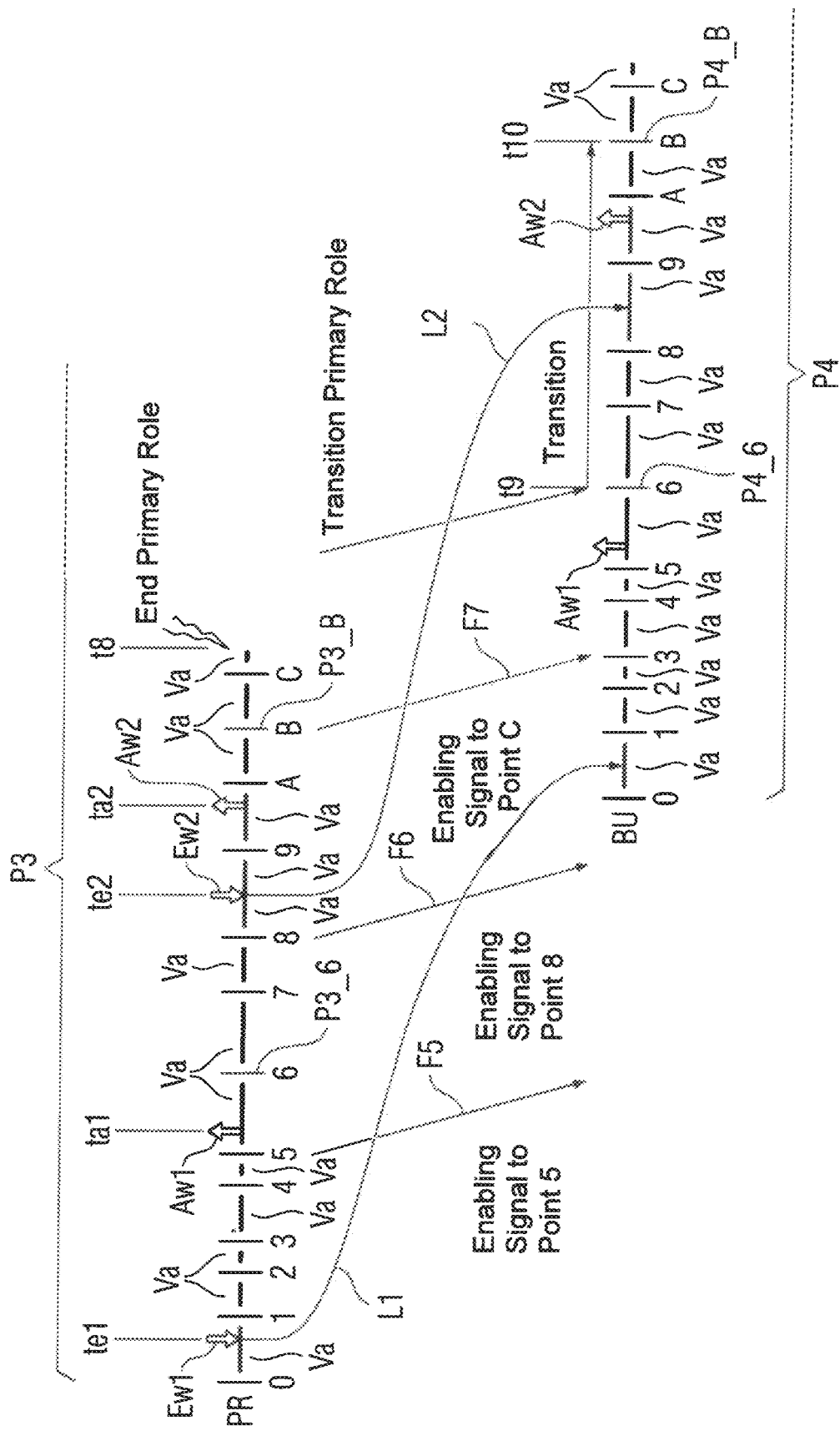
FIG. 4 shows the switchover of the primary role.

The reader is referred below to FIG. 4, in which a transition of the primary role from the primary PR to the backup BU is shown.

In the manner described the primary PR transfers to the backup BU enabling signals F5, F6, F7, wherein it is assumed that, at a time t8, the primary PR ends its primary role. The end of the primary role can be caused by the primary PR stopping the primary role of its own accord and transferring this property to a backup BU in the control system. This could be notified to the backup BU by a corresponding signal of the previous primary PR. As an alternative it would even be conceivable for the backup BU of its own accord—i.e. without a corresponding signal on the part of the previous primary PR—to take over the primary role. Through this it would even be possible for the control system, on failure of a previous primary PR, to continue to maintain its control task.

Because of the enabling signals F5 to F7 the backup BU processes the processing sections Va of control program P4 up to a transition point P4_B (transition point B), wherein these processing sections Va correspond to the processing sections Va of a control program P3 up to transition point P3_B (transition point B) that were processed by means of the primary PR.

At times te1, te2 the primary PR, as part of the processing of the control program P3, accesses the peripheral unit PE for reading, which means that the primary PR reads in plant input values Ew1, Ew2, processes these in accordance with the control program P3 and creates output values, also referred to below as process output information, process output values, plant output information or plant output values, Aw1, Aw2 that the primary PR transfers to the peripheral unit PE at times ta1, ta2. The primary PR transfers to the backup BU the process input values Ew1, Ew2, which is indicated in the drawing by curved lines L1, L2. The transfer takes place together with the enabling signals F5, F7 in order not to increase the communication load between the primary PR and the backup BU during the processing of the processing sections Va up to these enabling signals F5, F7. The backup BU likewise processes these process input values Ew1, Ew2 according to the control program P4 and likewise creates the process output values Aw1, Aw2 that the backup BU transfers to the peripheral unit PE. It is assumed in this case that the peripheral unit PE is a "switched" peripheral unit with a primary and a secondary connection. The primary connection is intended for receipt of the process output values of the primary PR and the secondary connection for receipt of the process output values of the backup BU, wherein the backup BU switches the peripheral unit PE from the primary to the secondary connection if the backup BU recognizes that the previous primary PR is giving up its primary role. Preferably this takes place by the previous primary PR transmitting a corresponding signal to the selected backup BU. It is however also possible for the backup BU to take over the primary role of its own accord, for example because it has no longer received a signal over a specific period of time from the primary PR and said primary has therefore possibly failed. Furthermore it is also possible for the primary role to switch cyclically, in particular at fixed predetermined intervals or at fixed predetermined times, between the subsystems. In this case too there is no need for a signal from the previous primary PR to the backup RU in order to initiate the switch of primary role.

As explained, it is assumed that at a time t8 the primary role of the previous primary PR ends. The backup BU recognizes this for example by the primary PR sending a corresponding message to the backup BU. After the backup BU has recognized the end of the primary role of the previous primary PR, for example at a time t9, the backup BU does not immediately take over the primary role, since at this time t9 the system state of the backup BU differs from that of the primary PR and a smooth switchover or transition is therefore not possible. At this time t9 the backup BU has only processed the processing sections Va up to a transition point P4_6 (transition point 6), the corresponding processing sections Va of the primary PR up to a transition point P3_6 (transition point 6) thus "lie" in the past. Only after a transition, i.e. after the backup BU has processed the processing sections Va enabled by means of the enabling signal F7 up to transition point P4_B at a time t10, does the backup RU take over the primary role and thus the control of the automation plant, wherein at this time t10 the backup BU switches the peripheral unit PE from the primary to the secondary connection. During this transition the (previous) backup BU therefore still runs through the same thread stack path-synchronously and processes the same process input values as the (previous) primary PR has processed before its failure, wherein the (previous) backup BU, because of these input values, determines the same process output values as the (previous) primary PR. The transition is then ended when the target of the last enabling signal—in the present example the processing of the processing sections Va up to interruption point P4_B—is reached.

Figure 5:
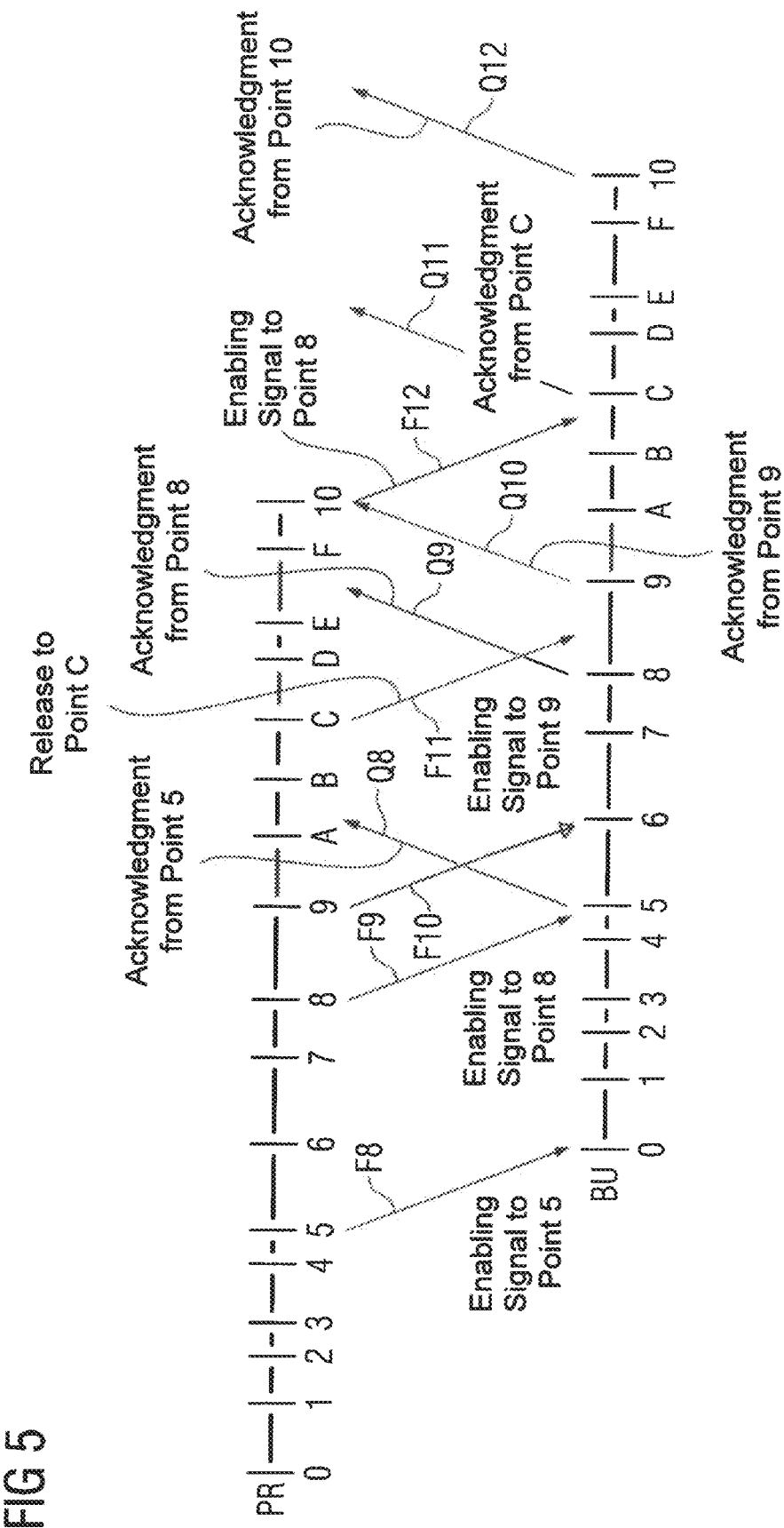
FIG. 5 shows the time lag between the primary and the backup.

In order to keep the temporal time lag of the backup compared to the primary at a tolerable level—as illustrated in FIG. 5—each enabling signal F8 to F12 of the primary PR is then acknowledged by the backup BU asynchronously by means of respective acknowledgements Q8 to Q12, if the backup BU has concluded the respective processing. The primary PR evaluates the number of unacknowledged enabling signals and determines from these the current time lag of the backup BU. In the case that the temporal time lag is too high or too long, which can lead for example to a loss of redundancy, the primary PR takes suitable measures to reduce the temporal time lag or not to let it get too great.

For example the primary PR, as a reaction to a time lag that is too great, can stop or delay the processing of lower-priority threads, wherein the processing of the higher-priority threads requires far less than 100% of the computing time. Thus the primary PR has fewer processing sections to run through and creates fewer enabling signals, so that the backup BU can "recover".

Figure 6:
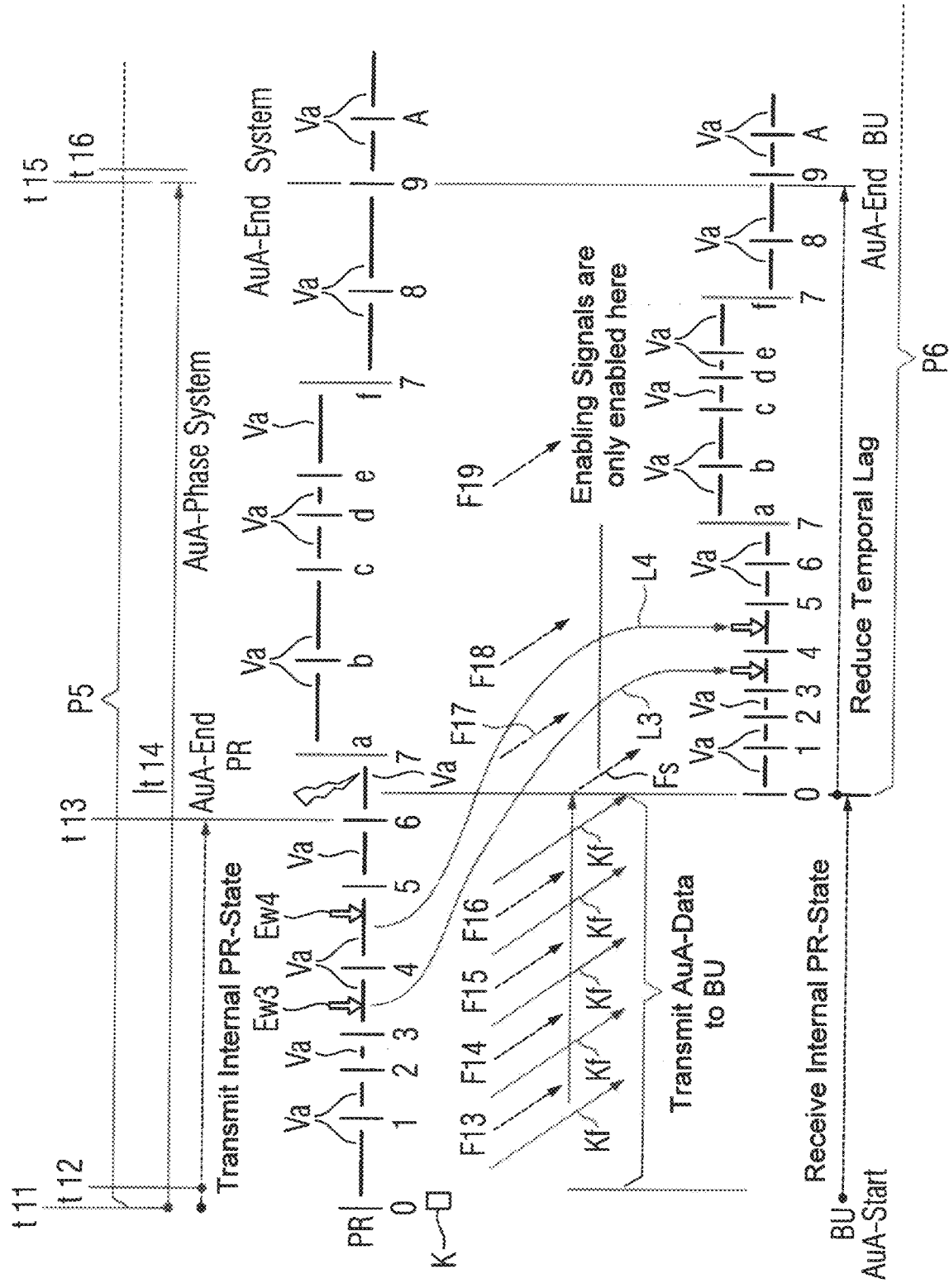
FIG. 6 shows the updating of a new backup.

With regard to the updating of new backups the reader is referred to FIG. 6, in which an update sequence of the automation system is shown.

Before the actual update sequence begins it must first be ensured that the same control program is present in the new backup BU to be linked into the control system as in the primary PR. If this is not the case, the new backup BU first obtains this control program, preferably from the network. It can be downloaded from the primary PR, from a backup already integrated in the control system or in principle from any other computer in the network provided for this purpose.

The update sequence begins at a time t11, by which the primary PR has recognized that a new backup BU is linked into the network, wherein as from this time 111 the update phase both of the primary PR and also of the backup BU begins. As from this time t11 the primary PR creates a local copy K of all relevant data, which represents its internal state at this time t11, wherein the primary PR continues to control the automation plant and processes processing sections Va of a control program P5. From a time t12 to a time t13, at which the update phase of the primary PR is concluded, the primary PR transfers this copy K fragmented to the backup BU—which is indicated in the drawing by arrows Kf—that the backup BU has completely received at a time 114. At this time t14 the backup BU now has the same internal state as the primary at time t11. As from time 112 all enabling signals of the primary PR and also all plant input values read in by the primary PR from the peripheral unit PE are further stored on the primary PR, the backup BU or a further subsystem of the automation system, wherein these enabling signals are released for processing by the backup BU only after the complete receipt of the copy K. In the present exemplary embodiment it is assumed that during a time segment from time t11 to time t13, at which the transmission of the copy K is concluded, the primary PR creates enabling signals F13, F14, F15, F16 and has further read in plant input values Ew3, Ew4. These enabling signals F13 to F16 and these process input values Ew3, Ew4 are released to the backup BU only as from a time t14, i.e. at the time at which the internal state of the primary PR is completely provided to the backup BU, which is indicated in the figure by an arrow Fs and by curved lines L3, L4. After this release by the primary PR the backup BU brings up to the internal state of the primary PR, in that backup BU processes the data of the copy K in accordance with the enabling signals F13 to F16. In this case the backup BU processes the processing sections Va of its control programs P6, which correspond to the processing sections Va of the control program P5 of the primary PR up to time t13, wherein the backup BU takes account of the process input values Ew3, Ew4 in respect of the processing of the control program P6.

Because of the fact that the backup BU brings up the internal state of the primary PR temporally asynchronously, in respect of the processing of the corresponding processing sections Va of the control program P6, the backup BU runs behind the primary PR, wherein this temporal time lag must be reduced to a tolerable level, since a temporal time lag that is too high can lead to a loss of redundancy. In order to reduce this temporal time lag there is provision for the processing speed of the backup BU to be higher relative to the processing speed of the primary PR, which is shown in the figure in the form of processing sections Va in the control program P6 shown "shortened". This relative increase in the processing speed of the backup BU can be brought about for example by the backup BU processing the processing sections Va of its program P6 more quickly or the primary PR processing the processing sections Va of its program P5 more slowly. Only when the time lag is recovered or reduced to a tolerable level or a predetermined value is the update phase of the backup BU beginning at time t12 and thus of the automation system concluded.

As part of the update phase of the backup BU, the backup BU, from the time t14 to the time t15, processes both the enabling signals F13 to F16 buffered during the transmission of the copy K and also enabling signals F17, F18, F19 that the primary PR transfers to the backup BU after this transmission. These enabling signals F17 to F19 indicate to the backup BU which processing sections Va of the control program P6 are further to be processed by the backup BU, wherein these processing sections Va correspond to the processing sections Va of the control program P5 that the primary PR has already processed as from time t14. In other words: After the primary PR has completely transferred the copy K to the backup BU or the backup BU has completely received this copy K, the backup BU, from time t14 to time t16, processes all released processing sections Va of its control program P6 that correspond to those that the primary PR has already processed from time t11 to time t15.

As from time t15 the update phase is concluded and the redundant automation system is expanded by a backup BU. The further executions of the corresponding program paths on the primary PR and the backup BU execute temporally asynchronously as from time t16 in the manner described above.

As already stated further above, preferably further backups are linked into the automation system—in particular according to the described method of operation for updating, until such time as an abort criterion is reached.

Figure 7:
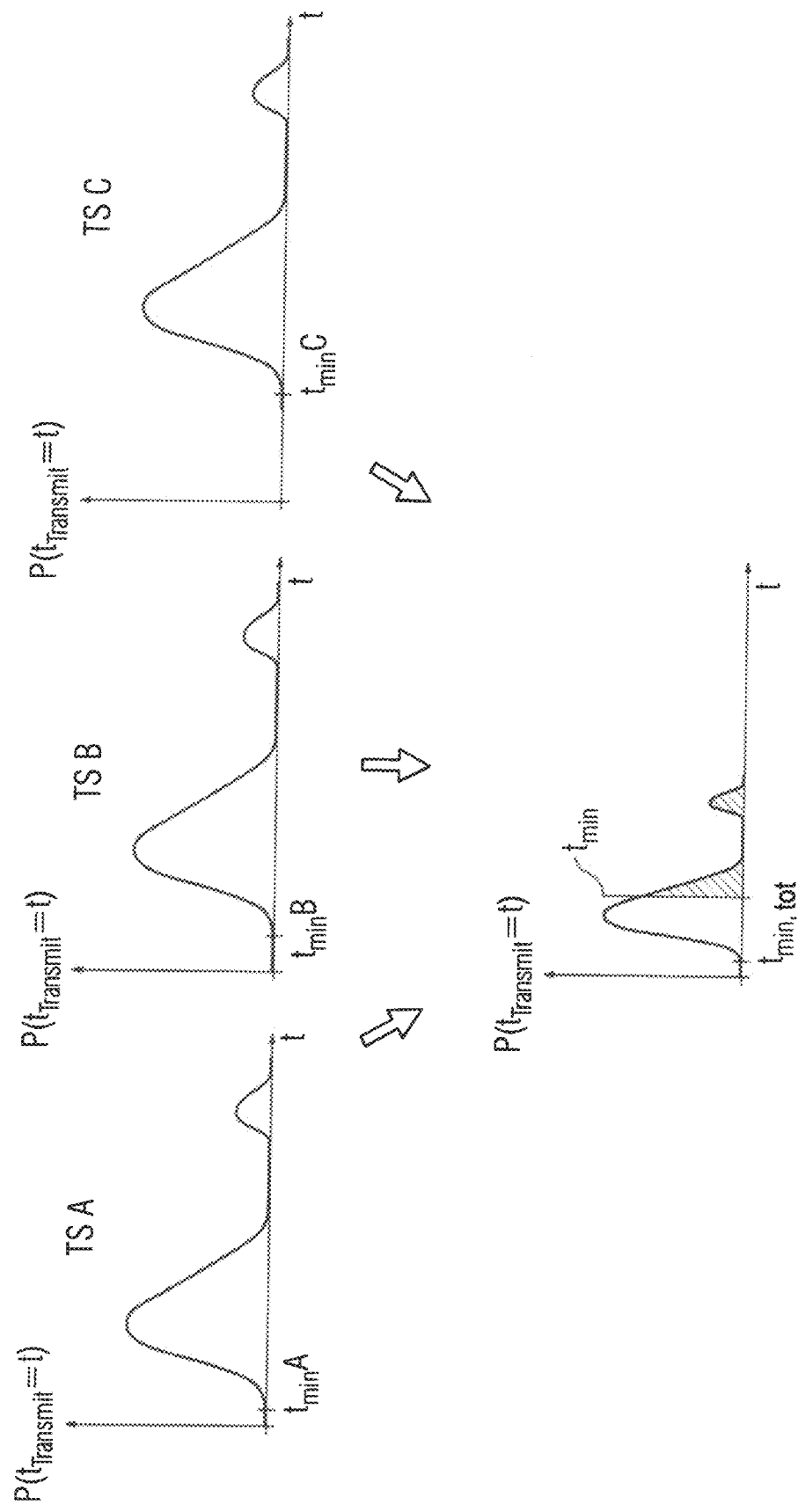
FIG. 7 shows schematically the effect of the method on the distribution function of the transmission times from the control to the peripheral unit.

FIG. 7 shows schematically the effect of the method on the distribution function of the transmission times between the control system and the peripheral unit. What is shown is the probability $P(t_{Transmit}=t)$, i.e. the probability P, that the delay corresponds to precisely t. The minimum transmission times $t_{min}$, A, $t_{min}$ B and $t_{min}$ C for the subsystems TS A, TS B and TS C can also be seen from the figure. If a required transmission time $t_{min}$ is assumed then the probability of falling below this increases with each further logical connection to the peripheral unit, i.e. with each further backup in the control system. Even if one of these logical connections only possesses a low probability for short transmission times, the resulting transmission time is further improved. Only when the minimum transmission time lies above the time required does no positive contribution arise (see FIG. 7 top right). A deterioration of the resulting distribution does not occur despite this, since the peripheral unit ignores the long transmission times.

As can be seen from FIG. 7, in the exemplary embodiment the required transmission time $t_{min}$ is undershot by the transmission time $t_{min, tot}$ able to be reached by the control system.

With each new logical connection that uses different network paths the probability of long transmission times is potentially reduced. With each further logical connection however the load on the network also increases, which tends to lead to longer transmission times.

Advantageously new logical connections (further backups) are added until
  the probability of long transmission times rises again, for example because of increased network traffic;
  the probability of long transmission times is less that the probability of a failure of the control system.

Long transmission times here means times that lie above the required transmission time. Through this process it is ensured that the best possible transmission times are achieved in a network without unnecessarily imposing a load on the network.

Figure 8:
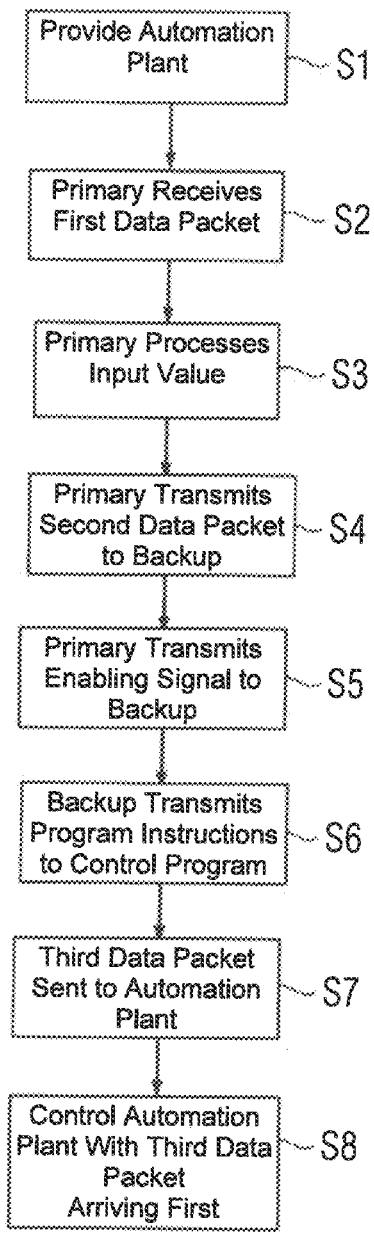
FIG. 8 shows method steps when carrying out an inventive method.

Illustrated once again below in the form of a flow diagram in accordance with FIG. 8 are the main method steps for carrying out an inventive method.

In a first method step S1 an automation system, comprising at least one automation plant to be controlled, installed at a plant location and also at least two control applications configured for control of the automation plant, forming a part of a Cloud computing structure, of which the computing resources are provided at different locations and which are connected to each other and to the automation plant for communication purposes via a network that has a plurality of communication node points and communication paths connecting these to one another, are provided, wherein a first control application of the control applications acts as the primary and at least one second control application of the control applications as the backup.

In a further method step S2 the primary receives via the network a first data packet emanating from the automation plant, comprising an input value of the automation plant.

In a further method step S3 the primary processes the input value in accordance with specific program instructions of a control program comprised by the control applications, present at least in essentially identical form in the primary and the backup, and from these creates an output value (a control instruction) for an actuator comprised by the automation plant.

In a further method step S4 the primary or the automation plant transmits a second data packet comprising the input value via the network to the backup.

In a further method step 35 the primary transfers an enabling signal (F1, F2, . . . ) to the backup.

In a further method step S6 the backup, as a result of the enabling signal, transmits program instructions of the control program that correspond to the specific program instructions already processed of the control program by means of the primary, and from these the backup likewise creates the output value for the actuator comprised by the automation plant.

In a further method step 37 the third data packets comprising the respective output value are sent both from the primary and also from the backup to the automation plant.

In a further method step 38 the third data packet arriving first at the automation plant with the output value comprised by it is used for control of the actuator. Third data packets comprising the output value concerned arriving at the automation plant at a later time remain unconsidered in the further process.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for operating an automation system, the automation system comprising an automation plant which is installed at a plant location, and a plurality of control applications configured to control the automation plant and forming a part of a Cloud computing structure having computing resources which are disposed at different locations and which are connected to each other and to the automation plant for communication via a network having a plurality of communication node points and communication paths connecting the communication node points to one another, the method comprising:
  designating a first control application of the plurality of control applications as a primary control application and at least one second control application of the plurality of control applications as a backup control application, with the primary control application, receiving via the network a first data packet originating from the automation plant and having an input value of the automation plant, processing, with the primary control application, the input value in accordance with program instructions of a control program which are encompassed by the plurality of control applications and which are present in substantially identical form in the primary control application and in the backup control application, and generating therefrom an output value for an actuator that is part of the automation plant, transmitting a second data packet comprising the input value via the network to the backup control application, transmitting an enabling signal from the primary control application to the backup control application, in response to the enabling signal, processing with the backup control application the program instructions that correspond to the program instructions that were already processed by the primary control application, and generating therefrom with the backup control application the output value for the actuator, transmitting to the automation plant the output value from the primary control application and the output value from the backup control application as third data packets, and controlling the actuator with a third data packet of the third data packets that arrives first at the automation plant, originating either from the primary control application or from the backup control application.

2. The method of claim 1, further comprising:
continuously generating with the automation plant during operation of the automation system first data packets and transferring the first data packets to the primary control application;

generating with the automation plant or with the primary control application second data packets and transferring the second data packets to the backup control application; and generating with the primary control application and the backup control application third data packets and transferring the third data packets to the automation plant.

3. The method of claim 1, wherein the second data packet comprising the input value is transmitted from the primary control application to the backup control application via the network.

4. The method of claim 1, wherein the second data packet comprising the input value is transmitted from the automation plant to the backup control application via the network.

5. The method of claim 1, wherein in the automation system at least some of the plurality control applications act as backup control applications and have computing resources disposed at different locations and connected to the automation plant and also to the primary control application for communication via the network, with the plurality of the backup control applications receiving the first data packets from the automation plant or from the primary control application and generating the third data packets and transfer the third data packets to the automation plant.

6. The method of claim 1, further comprising:
with the automation plant, receiving via the network a plurality of first data packets and assigning to each of the plurality of the first data packets transmitted from the automation plant a unique sequence number;

assigning to the third data packets from the primary control application in each case a sequence number that correspond to the unique sequence number of the first data packets, and assigning to the third data packets from the backup control application in each case a sequence number that correspond to the unique sequence number of the first data packets;

with the automation plant, recognizing based on the sequence number of the third data packets transmitted to the automation plant which of the third data packets corresponding to the first data packets arrives first at the automation plant; and with the automation plant, further processing the data packet of the third data packets that arrives first.

7. The method of claim 6, wherein the automation plant ignores the subsequently arriving third data packets with the unique sequence number.

8. The method of claim 1, wherein at least one of the first data packet, the second data packet and the third data packet is transmitted between components of the automation system in accordance with a PROFINET standard.

9. The method of claim 1, further comprising integrating into the automation system as part of an update phase at least one additional backup control application.

10. The method of claim 9, further comprising integrating into the automation system further backup control applications until an abort criterion is reached.

11. The method of claim 10, further comprising:
determining, by using statistical methods, an extent to which the automation system is able to reduce response times by integrating the further backup control applications; and depending on a result of the determination, integrating a further backup control application into the automation system.

12. The method of claim 1, further comprising switching an assignment of a role of a specific control application as the primary control application or as the backup control application during operation of the automation system.

13. The method of claim 12, wherein the assignment is switched cyclically.

14. The method as claimed in claim 12, further comprising:
determining transmission times for the first data packet transmitted from the automation plant to the primary control application and for the second data packet transmitted from the automation plant to the backup control application or for the third data packet received by the automation plant from the primary control application or from the backup control application; and assigning a role of the primary control application depending on the determined transmission times.

15. The method of in claim 14, wherein the transmission times are determined cyclically.

16. The method of claim 1, wherein the control applications carry out control functions of a programmable logic control in the automation plant.

17. The method of claim 1, wherein the enabling signal is transmitted from the primary control application to the backup control application after a predetermined interval has elapsed or after an event has occurred.

18. An automation system, comprising an automation plant and a redundant Cloud-based control system which comprises a plurality of control applications that form part of a Cloud computing structure having computing resources disposed at different locations and connected to each other and to the automation plant to be controlled by the control applications for communication via a network that has a plurality of communication node points and communication paths connecting the node points to one another, the automation system configured to designate a first control application of the plurality of control applications as a primary control application and at least one second control application of the plurality of control applications as a backup control application, with the primary control application, receive via the network a first data packet originating from the automation plant and having an input value of the automation plant, process, with the primary control application, the input value in accordance with program instructions of a control program which are encompassed by the plurality of control applications and which are present in substantially identical form in the primary control application and in the backup control application, and generate therefrom an output value for an actuator that is part of the automation plant, transmit a second data packet comprising the input value via the network to the backup control application, transmit an enabling signal from the primary control application to the backup control application, in response to the enabling signal, process with the backup control application the program instructions that correspond to the program Instructions that were already processed by the primary control application, and generate therefrom with the backup control application the output value for the actuator, transmit to the automation plant the output value from the primary control application and the output value from the backup control application as third data packets, and control the actuator with a third data packet of the third data packets that arrives first at the automation plant, originating either from the primary control application or from the backup control application.

19. A redundant, Cloud-based control system for an automation system comprising an automation plant, wherein the redundant, Cloud-based control system comprises a plurality of control applications that form part of a Cloud computing structure having computing resources disposed at different locations and connected to each other and to the automation plant to be controlled by the control applications for communication via a network that has a plurality of communication node points and communication paths connecting the node points to one another, the redundant, Cloud-based control system configured to designate a first control application of the plurality of control applications as a primary control application and at least one second control application of the plurality of control applications as a backup control application, with the primary control application, receive via the network a first data packet originating from the automation plant and having an input value of the automation plant, process, with the primary control application, the input value in accordance with program instructions of a control program which are encompassed by the plurality of control applications and which are present in substantially Identical form in the primary control application and in the backup control application, and generate therefrom an output value for an actuator that is part of the automation plant, transmit a second data packet comprising the input value via the network to the backup control application, transmit an enabling signal from the primary control application to the backup control application, in response to the enabling signal, process with the backup control application the program instructions that correspond to the program instructions that were already processed by the primary control application, and generate therefrom with the backup control application the output value for the actuator, transmit to the automation plant the output value from the primary control application and the output value from the backup control application as third data packets, and control the actuator with a third data packet of the third data packets that arrives first at the automation plant, originating either from the primary control application or from the backup control application.

* * * * *